United States Patent

Neuffer et al.

[15] 3,683,262
[45] Aug. 8, 1972

[54] DEVICE FOR THE CONTROL OF LINE-COMMUTATED CONVERTERS

[72] Inventors: Ingemar Neuffer, Erlangen; Hermann Waldmann, Weiher, both of Germany

[73] Assignee: Siemens Aktiengesellschaft, Berlin and Munich, Germany

[22] Filed: Aug. 12, 1971

[21] Appl. No.: 171,256

[30] Foreign Application Priority Data

Aug. 18, 1970 Germany.........P 20 40 893.9

[52] U.S. Cl. ...................321/5, 321/38, 321/40, 321/47
[51] Int. Cl. ..............................................H02m 1/08
[58] Field of Search................321/5, 18, 38, 40, 47

[56] References Cited

UNITED STATES PATENTS

| | | | |
|---|---|---|---|
| 3,551,778 | 12/1970 | Ekstrom | 321/18 |
| 3,465,234 | 9/1969 | Phadke | 321/18 |
| 3,593,105 | 7/1971 | Brohaugh | 321/40 |

FOREIGN PATENTS OR APPLICATIONS 1,806,071   10/0969   Germany.....................321/47

OTHER PUBLICATIONS

IEEE Transactions on Power Apparatus and Systems, "A Refined HVDC Control System," Ekstrom & Liss, Vol. PAS- 89, No. 5/6, May/June 1970, pp. 723-732.

*Primary Examiner*—William H. Beha, Jr.
*Attorney*—Curt M. Avery et al.

[57] ABSTRACT

In a device for the control of line-commutated converters, the fundamental of the line voltage vector is filtered out by a vector phase filter and is shifted back in phase by an angle corresponding to the desired firing delay angle by a vector rotator as a function of a DC control voltage. The output of the vector rotator then exercises control via an angle switch which determines the trigger pulses of the converter valves at definite, recurring angular positions of the vector quantity fed to it. The control is independent of the wave shape and the frequency of the system.

15 Claims, 11 Drawing Figures

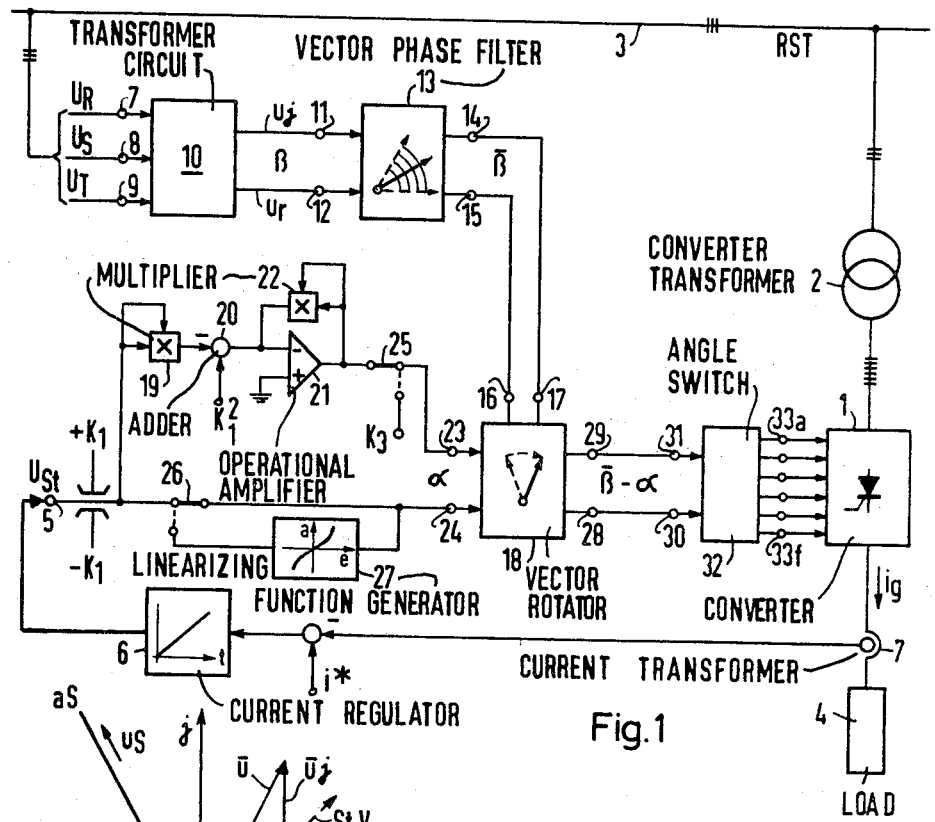
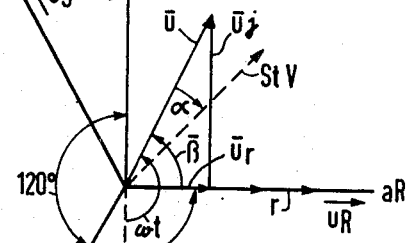
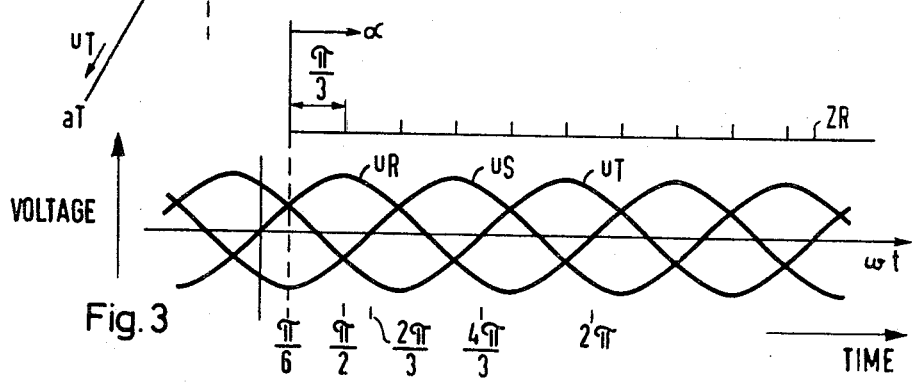

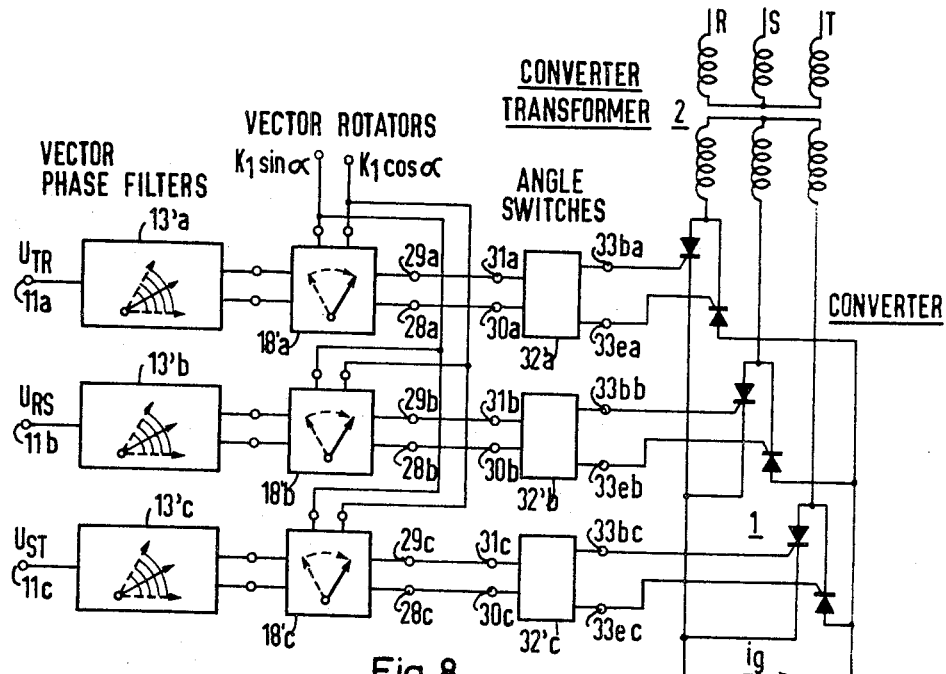
Fig. 8
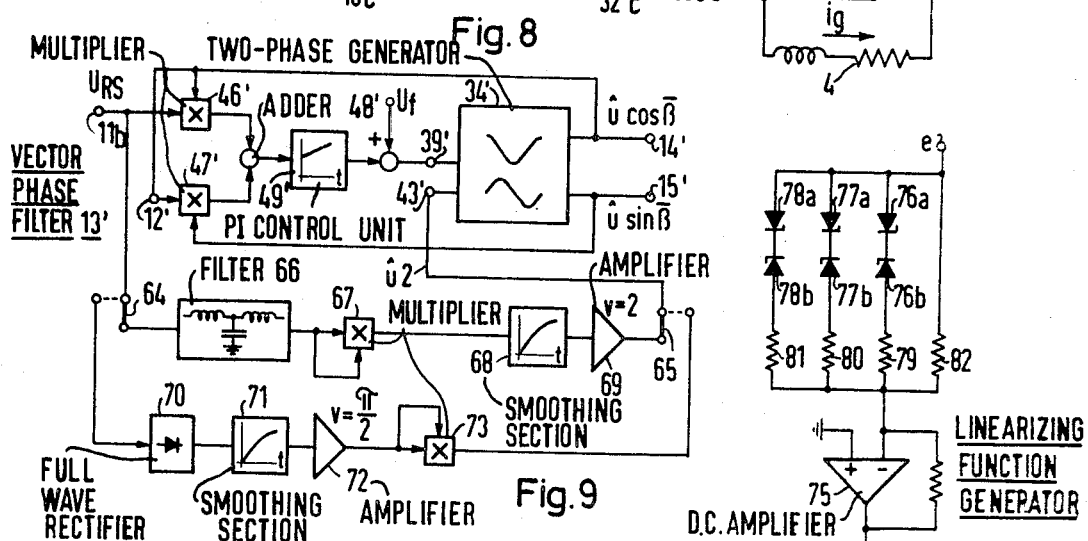
Fig. 9
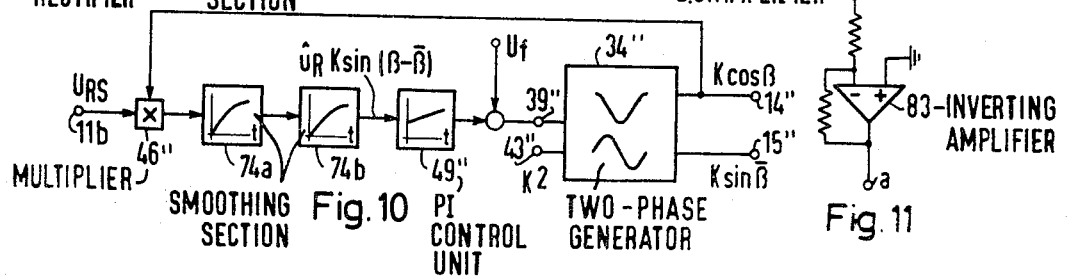
Fig. 10
Fig. 11

DEVICE FOR THE CONTROL OF LINE-COMMUTATED CONVERTERS

The invention relates to a device for the control of line-commutated converters. More particularly, the invention relates to a device for the control of converter installations for the transmission of high DC voltages.

In line-commutate converter installations, the zero crossing of an AC voltage derived from the line voltage is commonly used for the synchronization of the control units provided for firing the individual converter valves. The zero crossing triggers sawtooth generators which release firing or ignition pulses if a voltage magnitude preset by the control voltage is reached. If, however, the zero crossing of the line voltage is disturbed by superimposed harmonics or line voltage breaks, which occurs particularly in weak systems loaded with converters, the firing angle of the converter valves deviates from the preset value in an uncontrollable manner.

If several converters are connected to the same system, mutual interaction may occur in known control units. This further enhances the aforedescribed effect. For this reason, the synchronizing voltage is in most cases smoothed by means of an RC combination, in which case a frequency-dependent phase shift of the smoothed synchronizing AC voltage must be provided as a countermeasure. Although such phase shift may be taken into consideration for one definite line frequency in determining the generation of the firing or ignition pulses which must be initiated by the synchronizing voltage, any deviation from said line frequency causes basically a corresponding shift of the firing times from their preset values.

An object of our invention is to provide a control unit for line-connected converters which operates independent of harmonics, voltage breaks and frequency variations of the line voltage, that is, without phase error.

Another object of the invention is to provide a control unit for line-commutated converters which functions with efficiency, effectiveness and reliability.

In accordance with the invention, a phase filter associated with the line voltage vector contains a two-phase generator free of harmonics. The frequency of the two-phase generator is determined by the output of a PI, or proportional-integrating, control which is energized on the input side by a quantity depending upon the difference between the phase angle of the line voltage vector and the phase angle of the vector formed by the output voltages of the two-phase generator. The two component voltages appearing at the output of the phase filter and two voltages determining the control angle are supplied to the inputs of a vector rotator. The output voltages of the vector rotator constitute the components of a rotating control vector. An angle switch is energized by the component voltages of the rotating control vector. The angle switch transmits, at definite recurring phase positions of the rotating control vector, control pulses which are used for the firing of the converter valves.

The basic principle of the invention is therefore to separate the fundamental component of the line voltage vector, free from its harmonic components in phase, and to provide, by a presettable phase rotation of the fundamental component, a rotating control vector which is directly suitable for firing or ignition control of the converter valves.

In accordance with the invention, a device for the control of a line-commutated converter having valves for the transmission of high DC voltage comprises a vector phase filter having inputs coupled to the line and outputs and associated with the line voltage vector. The vector phase filter comprises a two-phase generator having outputs, a PI control unit having an input and an output connected to the two-phase generator. The two-phase generator is harmonic-free and has a frequency determined by the output of the PI control unit and means coupled between the outputs of the two-phase generator and the input of the PI control unit for energizing the PI control unit by a quantity depending upon the difference between the phase angle ($\beta$) of the line voltage vector and the phase angle ($\bar{\beta}$) of the vector provided by the output voltages of the two-phase generator. The vector phase filter produces two component voltages at its outputs. A vector rotator has inputs connected to the outputs of the vector phase filter, other inputs and outputs. Means connected to the other inputs of the vector rotator provides two voltages determining the control angle ($\alpha$). The vector rotator produces at its outputs voltages comprising the components of a rotating control vector. An angle switch has inputs connected to the outputs of the vector rotator and outputs. The angle switch is energized by the component voltages of the rotating control vector and provides at its outputs at specific recurring phase positions of the rotating control vector control pulses utilized to fire the valves of the converter.

The two-phase generator of the vector phase filter comprises a first integrator having an input and an output, a first multiplier connected to the input of the first integrator for controlling the frequency thereof, a second multiplier, the first integrator having a negative feedback via the second multiplier for amplitude control, a second integrator having an input and an output, a third multiplier connected between the output of the first integrator and the input of the second integrator for controlling the frequency thereof, the first and second integrators and the first and third multipliers being connected in series circuit arrangement, and a fourth multiplier, the second integrator having a negative feedback via the fourth multiplier for amplitude control.

The sum of the squares of the two voltages determining the control angle ($\alpha$) is always constant.

Each of the second and fourth multipliers of the two-phase generator of the vector phase filter has an additional input. The two-phase generator further comprises an amplitude regulator having an integrating characteristic having an input and an output connected to the additional input of each of the second and fourth multipliers, adder means connected to the input of amplitude regulator, and means for applying to the adder means a constant voltage ($K_2^2$) and the sum of the squared output voltages of the two-phase generator in a manner whereby the difference between the constant voltage ($K_2^2$) and the sum of the squared output voltages of the two-phase generator is applied to the input of the amplitude regulator.

The means for providing two voltages determining the control angle ($\alpha$) comprises means for providing a control voltage ($U_{St}$), a squaring function generator having an input connected to the means for providing a control voltage and an output, an adder having a subtractive input connected to the output of the squaring function generator, an additive input and an output, means for applying a constant voltage to the additive input of the adder, and a root-deriving function generator having an input connected to the output of the adder and an output connected to one of the other inputs of the vector rotator. The means for providing a control voltage ($U_{St}$) is connected to the other of the other inputs of the vector rotator.

The means for providing two voltages determining the control angle ($\alpha$) comprises a linearizing function generator providing a control voltage ($U_{St}$). One of the voltages determining the control angle ($\alpha$) is constant and the other of the voltages determining the control angle is the control voltage provided by the linearizing function generator.

The linearizing function generator comprises a plurality of pairs of Zener diodes, a plurality of input resistors, each pair of Zener diodes being connected in series circuit arrangement with a corresponding one of the input resistors, each series circuit arrangement being connected in shunt with the others and an additional one of the input resistors being connected in shunt with the series circuit arrangements, a DC amplifier having a negative feedback, an input connected to the Zener diodes and the input resistors and an output, and an inverting amplifier having an input connected to the output of the DC amplifier.

The vector rotator comprises first, second, third and fourth multipliers each having two inputs and an output, one of the inputs of the vector rotator being connected to a first input of each of the first and second multipliers, the other of the inputs of the vector rotator being connected to a first input of each of the third and fourth multipliers, one of the other inputs of the vector rotator being connected to the second input of each of the first and third multipliers, the other of the other inputs of the vector rotator being connected to the second input of each of the second and fourth multipliers, a first operational amplifier having a subtractive input connected to the output of the third multiplier and an additive input connected to the output of the second multiplier, and a second operational amplifier having a subtractive input connected to the output of the second multiplier and an additive input connected to the output of the first multiplier and the output of the fourth multiplier.

The angle switch comprises a plurality of adding amplifiers having inputs connected to the outputs of the vector rotator and outputs, a plurality of threshold monitors each having an input connected to the output of a corresponding one of the adding amplifiers, and a plurality of AND gates having inputs connected to selected ones of the threshold monitors and outputs comprising the outputs of the angle switch.

The vector phase filter further comprises a multiplier having an input connected to an output of the two-phase generator, another input and an output, means for applying a related line voltage ($U_{RS}$) to the other input of the multiplier, and smoothing means connected between the output of the multiplier and an input of the two-phase generator.

The vector phase filter further comprises a pair of multipliers each having an input connected to a corresponding one of the outputs of the two-phase generator, another input and an output, means for applying a related line voltage ($U_{RS}$) to the other inputs of the multipliers, adder means having inputs connected to the outputs of the multipliers and an output connected to the input of the PI control unit for applying the sum of the outputs of the multipliers to said PI control unit, and amplitude shaping means for the related line voltage ($U_{RS}$) connected to an input of the two-phase generator.

The amplitude shaping means comprises a rectifier having an input connected to the means for applying the related line voltage ($U_{RS}$) and an output, smoothing means having an input connected to the output of the rectifier and an output, an amplifier having an input connected to the output of the smoothing means and an output, and a squaring function generator having an input connected to an output of the amplifier and an output connected to an input of the two-phase generator.

The amplitude shaping means comprises filter means having an input connected to the means for applying the related line voltage ($U_{RS}$) and an output, a squaring function generator having an input connected to the output of the filter means, smoothing means having an input connected to the output of the squaring function generator and an output, and an amplifier having an input connected to the output of the smoothing means and an output connected to an input of the two-phase generator.

Additional adder means has an input connected to the output of the PI control unit, another input and an output connected to a frequency control input of the two-phase generator, and a voltage ($U_f$) proportional to the line frequency is applied to the other input of the additional adder means.

In accordance with the invention, a device for the control of a line-commutated converter having valves for the transmission of high DC voltage, comprises a plurality of vector phase filters, one for each phase on the line, each vector phase filter having inputs coupled to the line and outputs and associated with the line voltage vector. Each vector phase filter comprises a two-phase generator having outputs, a PI control unit having an input and an output connected to the two-phase generator. The two-phase generator is harmonic-free and has a frequency determined by the output of the PI control unit. Means coupled between the outputs of the two-phase generator and the input of the PI control unit energizes the PI control unit by a quantity depending upon the difference between the phase angle ($\beta$) of the line voltage vector and the phase angle ($\bar{\beta}$) of the vector provided by the output voltages of the two-phase generator. Each vector phase filter produces two component voltages at its outputs. A plurality of vector rotators, one for each phase on the line, are provided, each vector rotator having inputs connected to the outputs of a corresponding one of the vector phase filters, other inputs and outputs. Means connected to the other inputs of each of the vector rotators provides two voltages determining the control angle ($\alpha$), each vector rotator producing at its outputs voltages comprising the components of a rotating control vector. A plurality of angle switches, one for each phase on the line, are provided, each angle switch having inputs connected to the outputs of a corresponding one of the vector rotators and outputs. Each of the angle switches is energized by the component voltages of the corresponding rotating control vector and provides at its outputs at specific recurring phase positions of the corresponding rotating control vector control pulses utilized to fire the valves of the converter.

In order that the invention may be readily carried into effect, it will now be described with reference to the accompanying drawings, wherein:

FIG. 1 is a block diagram of an embodiment of the device of the invention for the control of line-commutated converters;

FIG. 2 is a vector diagram illustrating the control principle of the device of the invention;

FIG. 3 is a graphical presentation of the three-phase voltages versus time;

FIG. 8 is a block diagram of another embodiment of the device of the invention for the control of line-commutated converters;

FIG. 9 is a block diagram of a vector phase filter which may be utilized as the vector phase filter 13'a, 13'b or 13'c of FIG. 8;

FIG. 10 is a block diagram of a phase filter of particularly simple structure which may be utilized in the device of the invention; and FIG. 11 is a block diagram of a linearizing function generator of simple structure which may be utilized as the linearizing function generator 27 of FIG. 1.

Figure 4:
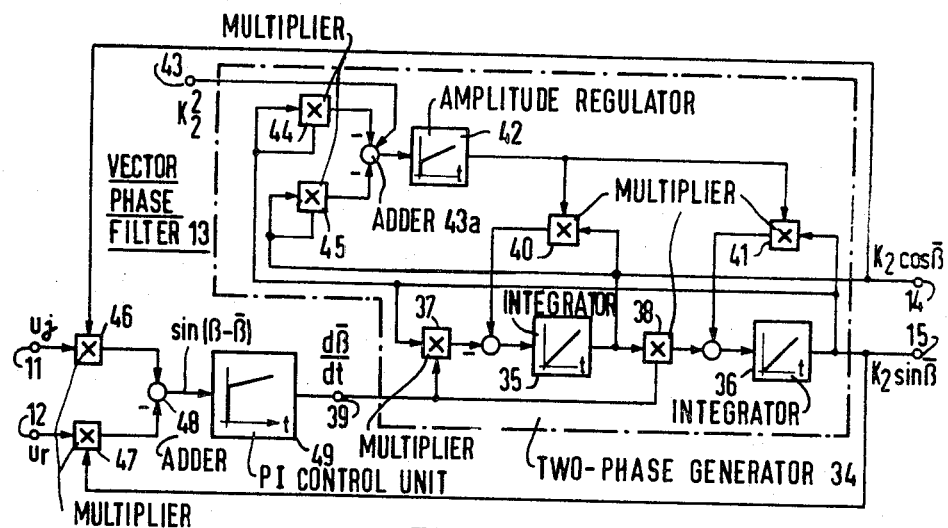
FIG. 4 is a block diagram of a vector phase filter which may be utilized as the vector phase filter 13 of FIG. 1.

FIG. 1 illustrates the basic arrangement of the control device of the invention for a six pulse converter 1. The converter 1 may, for example, be in a three-phase bridge circuit which is connected to a three-phase system 3 having phases R, S, T via a converter transformer 2. The converter 1 supplies a load 4 having a DC current $i_g$, the magnitude of which may be influenced by a DC control voltage $U_{St}$ applied to an input terminal 5 of the control unit.

A current regulator 6 may be utilized, for example, to regulate the DC current $i_g$ to a given value. A quantity obtained from a DC current transformer 7, which is proportional to the DC current $i_g$ and represents the actual value, is compared with a reference value $i^*$ in the input circuit of the current regulator 6. The output of the current regulator 6 is connected to the input terminal 5 of the control unit.

The three-phase voltages $U_R$, $U_S$ and $U_T$ of the three-phase system 3 are applied to input terminals 7, 8 and 9 of the control unit. The three-phase voltages $U_R$, $U_S$ and $U_T$ are converted in a transformer circuit 10 into a two-phase system in such a manner that two voltages $u_r$ and $u_j$ appearing at the output of said transformer circuit are proportional to two orthogonal components of the line voltage vector represented by the phase voltages $U_R$, $U_S$ and $U_T$. The transformer circuit 10 may comprise, for example, two adding amplifiers which realize the following relations:

$$u_r = U_R - \tfrac{1}{2}(U_S + U_T)$$

$$u_j = \sqrt{\tfrac{3}{2}} U_S - \sqrt{\tfrac{3}{2}} U_T$$

The same direction would be associated with the vector component $u_r$ as with the component of the line voltage vector described by the phase voltage $U_R$. In a suitably modified design of the transformer circuit 10, the voltage components $u_r$ and $u_j$ may, of course, also be obtained from the related voltages $U_{RS}$, $U_{ST}$ and $U_{TR}$ of the three-phase system 3. The voltages $u_r$ and $u_j$ therefore describe the line voltage vector in a rectilinear coordinate system. The phase, referred to this coordinate system, is given in each instance by the phase angle $\beta = \omega t - 90°$ wherein $\omega$ is the angular frequency of the phase voltages $U_R = u \sin \omega t$, $U_S = u \sin(\omega t - 120°)$ and $U_T = u \sin(\omega t - 240°)$.

The component voltages $u_r$ and $u_j$ are applied to input terminals 11 and 12 of a vector phase filter 13. The vector phase filter 13 solves the problem of separating the fundamental component of the line voltage vector from the harmonic components superimposed on it in a manner hereinafter described. The filter 13 provides at output terminals 14 and 15 a signal, correct in phase at any frequency, indicative of the fundamental component of the line voltage vector in the form of two-sine-cosine voltages $\bar{u}_r$ and $\bar{u}_j$ which are free of harmonics and are supplied to input terminals 16 and 17 of a vector rotator 18.

The vector rotator 18 decreases the phase $\bar{\beta}$ of the line voltage vector, supplied to it as the two component voltages $\bar{u}_r$ and $\bar{u}_j$, by an angle $\alpha$. The angle $\alpha$ is the control angle, and has a tangent corresponding to the ratio of the voltages applied to two additional input terminals 23 and 24 of the vector rotator 18.

The control voltage $U_{St}$ applied to the input terminal 5 is then directly applied to the input terminal 24 of the vector rotator 18 and, on the other hand, is applied to the subtractive input of an adder 20 via a square law function generator 19. The square law function generator 19 may comprise, for example, a multiplier. A constant voltage of magnitude $K_1^2$ is applied to the additive input of the adder 20. The output voltage of the adder 20 is applied to the input terminal 23 of the vector rotator 18 via a root-taking function generator. The root-taking function generator comprises an operational amplifier 21 having a very high open-circuit gain and a square law function generator 22 connected in the feedback path of said amplifier.

On the one hand, the ratio of the two voltages applied to the terminals 23 and 24 corresponds to the tangent of the control angle $\alpha$, by which the line voltage vector is rotated in the vector rotator 18. On the other hand, the sum of the squares of these voltages is always equal to the voltage $K_1^2$ applied to the additive input of the adder 20. Therefore, the control voltage $U_{St}$ applied to the input terminal 5 is always proportional to the cosine of the angle $\alpha$. Since the cosine of the control angle or firing delay angle of a converter is proportional to the DC voltage delivered by it, the aforedescribed circuit has the advantage that a directly proportional relation exists between the output voltage of the converter or rectifier 1 and the control voltage $U_{St}$ applied to the input terminal 5. This applies for a range of control angles from 0° to 180°.

It is advisable to utilize a limiter to provide that the input voltage acting upon the terminal 24 and the function generator 19, may move, as indicated, only between two voltage limits $+K_1$ and $-K_1$, which are symmetrical with respect to zero. The magnitudes of the voltage limits $+K_1$ and $-K_1$ corresponding to the root of the magnitude of the voltage $K_1^2$ applied to the additive input of the adder 20. Most simply, such a voltage limiter may comprise two diodes which are biased with the corresponding limit voltages and are shunted across the voltages applied to the input terminal 5. If the converter 1 is also to be operated as an inverter, it is recommended, in view of the inverter locking tolerance, that the negative voltage limit be made smaller than the value $K_1$.

For lesser requirements regarding linearity and control angle range, a variation would be useful in which the control voltage $U_{St}$ is applied directly to the input terminal 24 of the vector rotator 18 and a constant voltage $K_3$, which is not dependent on the control voltage $U_{St}$, is applied to the terminal 23. To accomplish this, a switch 25 would have to be in its vertical position, as indicated by a broken line. The angle of rotation or the control angle $\alpha$ would then increase, as before, with an increasing control voltage $U_{St}$, but no longer linearly with said control voltage for larger magnitudes of the said control voltage.

The linear relation between the control voltage $U_{St}$ and the control angle $\alpha$ may, however, easily be restored within a control angle range sufficient for many applications, by applying the control voltage $U_{St}$ to the input terminal 24 of the vector rotator 18 via a switch 26. In such case, the switch 26 is in the vertical position, shown in broken lines, and the control voltage $U_{St}$ is applied to the terminal 24 via a linearizing function generator 27.

The following relation holds between the output voltage $a$ and input voltage $e$ of the linearizing function generator 27.

$$a = \left(\frac{U_{max}^2}{P^2} - e^2\right)^{1/2} e$$

wherein $U_{max}$ is the maximum DC output voltage of the converter utilized and P is the desired proportionality factor between the control voltage $U_{St}$ and the converter output voltage. Such a function generator may be viewed as an amplifier element, the gain of which increases with increasing input voltage. The amplifier may be realized in a simple manner by a DC amplifier having negative feedback, the input circuit of which comprises a plurality of parallel-connected threshold diodes biased with different DC voltages, or Zener diodes, each in series with a resistor.

The rotating control vector lags the smoothed line vector by the angle $\alpha$ preset by means of the control voltage $U_{St}$. The voltage components of the rotating control vector, which appear at output terminals 28 and 29 of the vector rotator 18, are applied to input terminals 30 and 31 of an angle switch 32. The angle switch 32 transmits, at definite, recurring angle positions of the rotating control vector, control pulses which are used for firing the converter valves.

If the converter 1 consists of a six pulse three-phase bridge circuit, six voltage pulses are provided at output terminals 33a to 33f of the angle switch 32 in a manner hereinafter described in greater detail. The voltage pulses have rising flanks which are staggered by 60° and each of said pulses has a duration of 120°.

FIG. 2 is a vector diagram illustrating the control principle of our invention. FIG. 2 shows three axes $aR$, $aS$ and $aT$, mutually displaced by 120° in the direction of which phase voltage components $U_R$, $U_S$, $U_T$ of the line voltage vector act. In an orthogonal coordinate system having axes $r$ and $j$ the line voltage vector $\overline{U}$, separated from its harmonics, is defined by its two components $\overline{u}_r$ and $\overline{u}_j$, and its phase angle referred to said coordinate system is $\overline{\beta}$. Voltages proportional to the components $U_R$, $U_S$ and $U_T$ of a line voltage vector smoothed in this manner would appear at the output terminals 14 and 15 of the vector phase filter 13 (FIG. 1).

The smoothed line voltage vector $\overline{U}$ is decreased in phase by the vector rotator 18 by an angle $\alpha$ dependent upon the control voltage $U_{St}$. The resultant rotating control vector $StV$ therefore lags the line vector $\overline{U}$ by the phase angle $\alpha$. If provision is made that at angle positions preset in a fixed manner of the control vector $StV$ a firing pulse for the valves of the converter is generated each instant, the occurrence of these firing pulses is delayed in an adjustable manner by the control voltage with respect to reaching a definite angle position of the line voltage vector which, for example, corresponds to the natural commutation instant of the converter. The control angle $\alpha$ therefore corresponds, as hereinbefore stated, to the firing delay angle of the converter.

In the voltage diagram of FIG. 3, the three-phase voltages $U_R$, $U_S$ and $U_T$ of the three-phase system (FIG. 1) are shown versus time. A pulse raster ZR is provided by the angle switch 32 (FIG. 1) with the rotating control vector supplied to its input. The pulse raster ZR has a fixed mutual spacing of the individual raster pulses which is $\pi/3$ in a six pulse converter circuit. The pulse raster as a whole may be shifted in phase by the control quantity $\alpha$.

FIG. 4 illustrates the vector phase filter 13 of FIG. 1. The vector phase filter 13 is based on the idea of influencing the phase angle of a two-phase generator 34 which supplies voltages free of harmonics and proportional to orthogonal vector components. The vector phase filter 13 functions so that the difference of the phase angle of the generator 34 from the phase angle of the line voltage vector having harmonics, as indicated by the two component voltages $u_j$ and $u_r$ at the input terminals 11 and 12, disappears in the means, whereby the fluctuations caused by the superimposed harmonics are separated from the variations in time of the fundamental itself and may be smoothed by themselves.

The harmonic-free two-phase generator 34 comprises, in a known manner, integrators 35 and 36, series-connected in ring fashion. A multiplier 37 has an output connected to the input of the integrator 36. A multiplier 38 has an input connected to the output of the integrator 35 and an output connected to the input of the integrator 36. Each of the multipliers 37 and 38 has a second input having a voltage applied thereto in parallel with the other from an input terminal 39. The frequency of the output voltages of the integrators 35 and 36 is proportional to the multipliers 37 and 38. The output voltages of the integrators 35 and 36 are provided the output terminals 14 and 15.

Voltages $K_2 \cos \bar{\beta}$ and $K_2 \sin \bar{\beta}$ appear at the output terminals 14 and 15 and define a vector. The phase angle $\bar{\beta}$ of the vector formed by such voltages corresponds to the time integral of the voltage applied at the input terminal 39. In order to insure that the two-phase generator 34 generates oscillations of constant amplitude, the integrators 35 and 36 are fed back, for amplitude stabilization, via two additional multipliers 40 and 41, respectively. The output signal of an amplitude regulator 42 having a PI characteristic is applied to the second input of each of the multipliers 40 and 41.

A constant voltage $K_2^2$ is additively applied to an adder 43a. The output voltages of the integrators 35 and 36 are applied to multipliers 45 and 44, respectively. The multipliers 44 and 45 square the voltages applied to them. The difference between the constant voltage $K_2^2$ and the sum of the output voltages of the integrators, 35 and 36, squared, is applied to the input of the amplitude regulator 42 by the adder 43a. The output voltage of the amplitude regulator 42 then varies until the amplitudes of the sine-cosine voltages appearing at the output terminals 14 and 15 are equal to the square root $K_2$ of the voltage applied to the input terminal 43.

The output terminals 14 and 15 of the two-phase generator 34 are connected to the inputs of multipliers 46 and 47, respectively. The component voltages $u_j$ and $u_r$ are applied to the other inputs of the multipliers 46 and 47, respectively, via the input terminals 11 and 12. The output of the multiplier 46 is additively applied to an input of an adder 48 and the output of the multiplier 47 is subtractively applied to the other input of the adder 48, so that the output of said adder is a quantity proportional to the sine of the instantaneous difference angle between the line voltage vector and the rotating vector provided by the two-phase generator 34.

Since the output signal of the adder 48 represents the input quantity of a PI control unit or regulator 49 acting on the frequency setting input 39, the control unit is effective through a change OF ITS OUTPUT QUANTITY $d\bar{\beta}/dt$ and therefore also of the phase angle $\bar{\beta}$ of the two-phase generator 34, to provide a stationary condition which is reached when the input quantity of said control unit vanishes in the mean. The vector defined by the output voltages $K_2 \cos \bar{\beta}$ and $K_2 \sin \bar{\beta}$ then always points in the direction of the fundamental component $\bar{U}$ of the line voltage vector, or only periodic oscillates about said direction which, however, may be damped as much as desired if the proportional gain of the PI control unit 49 is selected to be sufficiently small and its time constant sufficiently large.

Figure 5:
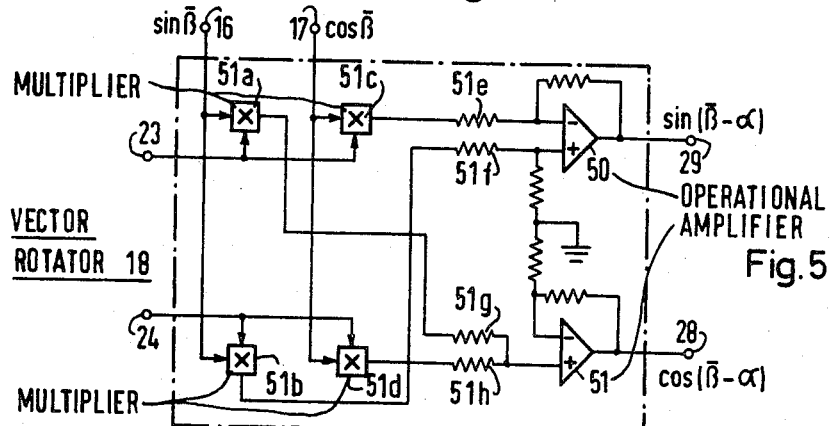
FIG. 5 is a block diagram of a vector rotator which may be utilized as the vector rotator 18 of FIG. 1.

FIG. 5 shows the vector rotator 18 of FIG. 1. The vector rotator 18 of FIG. 5 comprises two operational amplifiers 50 and 51 having inputs connected to the outputs of four multipliers 51a, 51b, 51c and 51d. A plurality of resistors 51e, 51f, 51g and 51h are connected to the inputs − and + of the amplifiers 50 and 51. The resistors 51e and 51g have the same resistance value, as do the resistors 51f and 51h. the multipliers 51a and 51'b are connected in a pair to the input terminal 16 and the multipliers 51c and 51d are connected to the input terminal 17. The multipliers 51a and 51c are connected to the input terminal 23 and the multipliers 51b and 51d are connected to the input terminal 24.

If voltages of the form $\sin \bar{\beta}$ and $\cos \bar{\beta}$, which are proportional to the components of the smoothed line voltage vector $\bar{U}$, are applied to the input terminals 16 and 17, voltages are provided at the output terminals 28 and 29 which are proportional to the cosine and the sine of the difference angle $\bar{\beta} - \alpha$. The tangent of the angle $\alpha$ corresponds to the ratio of the voltages at the input terminals 23 and 24.

Figure 6:
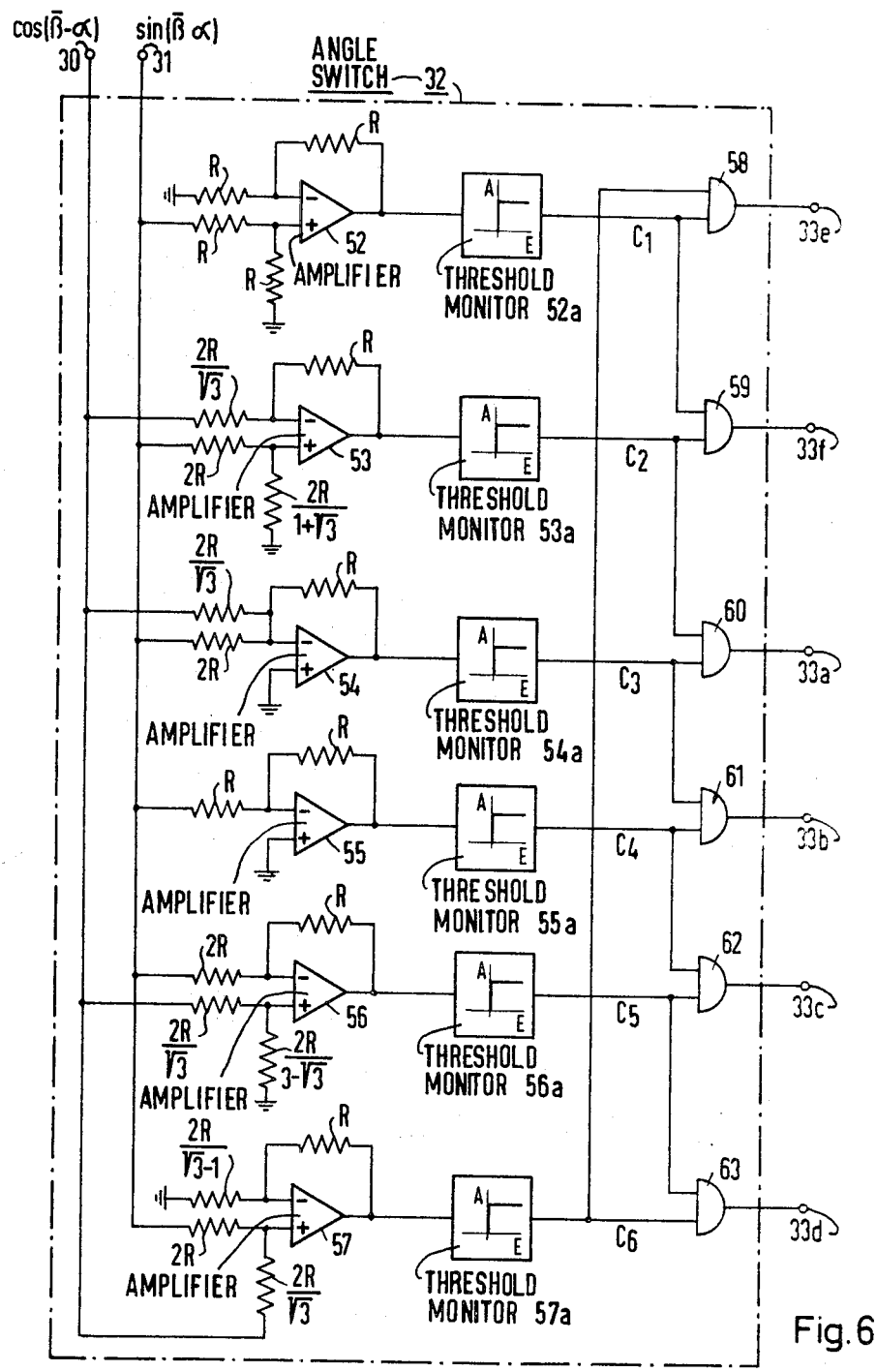
FIG. 6 is a block diagram of an angle switch which may be utilized as the angle switch 32 of FIG. 1.

FIG. 6 shows the angle switch 32 of FIG. 1. The angle switch 32 produces control pulses for firing the converter valves from the component voltages $\sin(\bar{\beta} - \beta)$ and $\cos(\bar{\beta} - \alpha)$ of the continuously revolving control vector formed at the output of the vector rotator 18. The component voltages are added in six amplifiers 52 to 57 to different extents in such a manner that six sinusoidal voltages, shifted by $\pi$ 13 with respect to each other, are provided at the outputs of said amplifiers. To accomplish this, the circuit resistors of the individual amplifiers have the resistance ratios shown in FIG. 6.

The output of each of the amplifiers 52 to 57 is followed by a threshold monitor or limit indicator 52a, 53a, 54a, 55a, 56a and 57a, respectively. The threshold monitors 52a to 57a may comprise, for example, a known Schmitt trigger which for an input signal E different from zero delivers a constant positive output signal A. Pulse trains are therefore provided at the outputs of the threshold monitors 52a to 57a which are displaced by $\pi/3$ with respect to each other. The duration of each pulse train corresponds in each case to one half-period of the AC voltages applied to them, or to half a revolution of the control vector.

Figure 7:
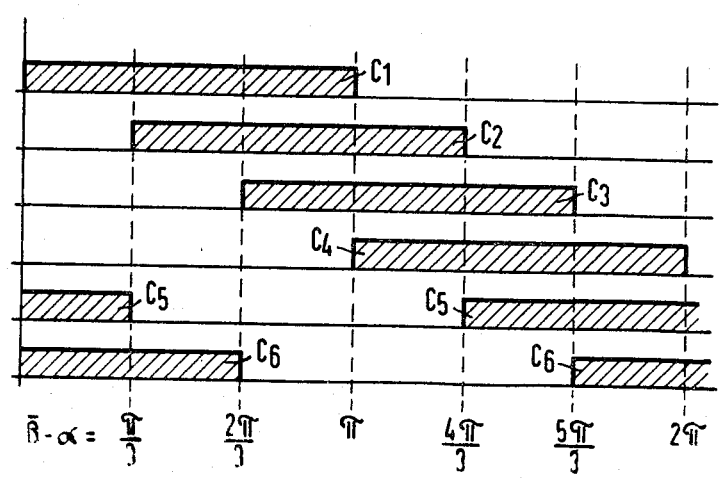
FIG. 7 is a graphical presentation of the pulse trains produced in the angle switch of FIG. 6.

The pulse trains produced in FIG. 6 are shown in detail in FIG. 7. These are pulse trains C1 to C6. An AND gate 58 has a first input connected to the output of the threshold monitor 57a, a second input connected to the output of the threshold monitor 52a, and an output connected to an output terminal 33e. An AND gate 59 has a first input connected to the output of the threshold monitor 52a, a second input connected to the output of the threshold monitor 53a, and an output connected to an output terminal 33f. An AND gate 60 has a first input connected to the output of the threshold monitor 53a, a second input connected to the output of the threshold monitor 54a, and an output connected to an output terminal 33a.

An AND gate 61 has a first input connected to the output of the threshold monitor 54a, a second input connected to the output of the threshold monitor 55a, and an output connected to an output terminal 33g. An AND gate 63 has a first input connected to the output of the threshold monitor 55a, a second input connected to the output of the threshold monitor 56a, and an output connected to an output terminal 33c. An AND gate 63 has a first input connected to the output of the threshold monitor 56a, a second input connected to the output of the threshold monitor 57a, and an output connected to an output terminal 33d. The AND gates 58 to 63 provide output signals if the output voltages of the two threshold monitors feeding them have a magnitude different from zero.

As may be readily seen in FIG. 7, there appear in the aforedescribed manner at the output terminals 33a to 33f of the angle switch 32 six pulse trains each displaced by $\pi/3$ from the others. The pulse trains have a duration of $2\pi$ 13 and may therefore be used as firing pulses for the individual valves of a six pulse bridge rectifier. The output terminal 33a is connected to the control grid of that valve which conducts for the negative half-wave of the phase voltage $U_T$, the output terminal 33c is connected to the control grid of the converter valve for the positive half-wave of the phase voltage $U_S$, the output terminal 33d is connected to the control grid of the valve for the negative half-wave of the phase voltage $U_R$, the output terminal 33e is connected to the control grid of the valve for the positive half-wave of the phase voltage $U_T$, and the output terminal 33f is connected to the control grid of the valve for the negative half-wave of the phase voltage $U_S$.

While the embodiment of FIG. 1 is oriented toward a symmetrical system, in which the amplitudes of the three-phase voltages are therefore equal and the sum of their instantaneous values at any time has a value of zero, this is not the case in the embodiment of FIG. 8. The embodiment of FIG. 8 is therefore particularly suited for those cases where one- or two-phase system short-circuits have to be taken into consideration and the availability of firing pulses is to continue for the individual converter phases, regardless of such system short-circuits.

The embodiment of FIG. 8 includes for each phase a vector phase filter 13'a, 13'b, and 13'c respectively, which are energized by linked line voltages $U_{TR}$, $U_{RS}$ and $U_{ST}$, respectively. The embodiment of FIG. 8 also comprises vector rotators 18'a, 18'b and 18'c and angle switches 32'a, 32'b and 32'c. The angle switches 32'a, 32'b and 32'c differ from the angle switch of FIG. 6, since each of said angle switches has only two output terminals instead of the output terminals 33b and 33e. Nor do the angle switches 31'a to 31'c have the AND gates 58 and 61 associated with the outputs 33b and 33, or the amplifiers 52, 57 and 55, 56, associated with said gates.

In those cases where a firing pulse of short duration is considered sufficient, the angle switch 32'a, 32'b and 32'c may be considerably simpler in structure, since only those elements (FIG. 6) need be provided which are required for the generation of the signals C1 and C4, which are then fed to the output terminals 33b and 33e via a differentiating circuit. FIG. 8 illustrates the design of a six pulse three-phase bridge circuit with controlled valves, as well as the connection of the output terminals 33b and 33e to the control grids of the converter valves in the individual phases.

FIG. 9 shows a vector phase filter which may be utilized as the vector phase filter 13'a, 13'b or 13'c of FIG. 8. The vector phase filter of FIG. 9 corresponds in principle to the vector phase filter of FIG. 4. However, the linked or related line voltage $U_{RS}$ is fed to the terminal 11b as the input quantity, and the output voltage appearing at the output terminal 14' of the two-phase generator 34' serves as the input voltage at the terminal 12'. An additional feed voltage $U_f$ is applied to the frequency control input 39' of the two-phase generator 34'. The magnitude of the voltage $U_f$ corresponds to the instantaneous system frequency and may be provided, for example, by a known frequency-voltage converter fed at the line frequency. The additional feed voltage $U_f$ permits the precontrol of the two-phase generator 34' in frequency, while phase synchronization at the fundamental wave is provided in exactly the predescribed manner.

If the output voltages of the two-phase generator 34' indicate the amplitude K, a voltage appears at the output of the adder 48'. The output voltage of the adder 48', in addition to a voltage component proportional to the sine of the difference angle $\beta - \bar{\beta}$, exhibits a voltage component $$\tfrac{1}{2}[\hat{u}_{RS}(K-K^2)\sin(\beta+\bar{\beta})]$$

of practically twice the line frequency. Although this component does not put the phase synchronization in doubt in principle, it leads to a certain undesirable instability in the output quantity of the PI control unit or regulator 49'. Appropriately, the amplitude of the output voltage of the two-phase generator 34' is therefore matched as closely as possible to the amplitude $\hat{u}_{RS}$ of the input voltage $U_{RS}$. It may prove to be of advantage to provide this match automatically by utilizing an amplitude shaper operated from the line voltage $U_{RS}$.

In one embodiment, as shown in FIG. 9, with a pair of switches 64 and 65 in their vertical positions, as shown in the FIG., the amplitude shaper comprises a filter section 66, which may comprise, for example, a resonant circuit tuned to the fundamental frequency, and a squaring function generator or multiplier 67 connected to the output of said filter, a smoothing section 68 connected to the output of said multiplier, and an amplifier 69 having a gain of 2 connected to the output of said multiplier.

The function generator 67 provides an output quantity proportional to the square of the instantaneous value of the line voltage $U_{RS}$. Therefore, the amplifier 69 produces an output quantity which corresponds to the square of the amplitude $\hat{u}_{RS}^2$ of its fundamental wave. The output of the amplifier 69 is supplied to the amplitude control input 43' of the two-phase generator 34'. In this manner, the amplifier 69 insures that the amplitude of the AC voltage applied to the input terminal 12' of the phase filter practically corresponds to the amplitude of the voltage $U_{RS}$.

In the second embodiment shown in FIG. 9 which is provided when the switches 64 and 65 are in their horizontal, broken line, positions, the amplitude of the line voltage is formed from its mean DC value. This embodiment comprises a full-wave rectifier 70, a smoothing section 71 connected to the output of said rectifier, an amplifier 72 connected to the output of said smoothing section and having a gain of $\pi/2 \approx 1.58$, and a squaring function generator or multiplier 73 connected to the output of said amplifier. The output of the amplitude shaper is a voltage proportional to the square of the amplitude of the voltage $U_{RS}$. The output voltage of the amplitude shape is applied to the amplitude control input 43' of the two-phase generator 34' so that the undesired voltage component in the output voltage of the adder 48' practically disappears.

FIG. 10 shows a phase filter of particularly simple structure. Only the multiplier 46" is connected in the input. The undesired voltage component of higher frequency, which appears in the output signal of the multiplier 46, may be largely suppressed by a pair of smoothing sections 74a and 74b, so that at the input of the PI control unit 49", similarly to the embodiments of FIGS. 4 and 9, there is practically only one active quantity which is proportional to the sine of the difference angle between the phase angle of the line voltage vector and the phase angle of the vector produced by the two-phase generator 34".

It is essential in the embodiments of FIGS. 9 and 10, or in their three-phase application according to FIG. 8, that in the event of a short-circuit in one or several system phases the generation of the firing pulses for the individual converter phases continues undisturbed and is oriented solely according to the phase position of the linked line voltage associated with it. Even a temporary total breakdown of the system voltage will hardly influence the output quantity of the PI control unit or regulator 49'', which last determines the instantaneous phase position of the control vector, so that in the event of a subsequent return of the respective phase voltage the firing during the corresponding half-wave occurs practically at exactly the same point in time as before the occurrence of such a disturbance. An exceedingly large degree of operational reliability is thereby assured.

FIG. 11 shows a linearizing function generator of simple structure which may be utilized as the linearizing function generator 27 of FIG. 1. A negative-feedback operational amplifier 75 has, for example, three pairs of Zener diodes 76a and 76b, 77a and 77b, and 78a and 78b connected to its input in series-opposition. A resistor 79 is connected in series with the diodes 76a and 76b. A resistor 80 is connected in series with the diodes 77a and 77b. A resistor 81 is connected in series with the diodes 78a and 78b. A resistor 82 is connected in shunt with the diodes 76a and 76b, 77a and 77b, and 78a and 78b. The Zener diodes of each pair have equal Zener voltages, which differ from the Zener voltages of the other pairs.

At an increasing input voltage $e$, one diode of each pair therefore becomes successively conducting and thereby reduces the effective input resistance of a DC amplifier 75. The output signal of the DC amplifier 75 is supplied to an inverting amplifier 83, so that the characteristic indicated in the block symbol of the linearizing function generator 27 of FIG. 1 is obtained in principle. Provision may thus be made by a suitable number of pairs of Zener diodes and suitable gradation of the resistance values of the input resistors 79, 80, 81 and 82 for a sufficiently accurate approximation to the previously stated relation between the input voltage $e$ and the output voltage $a$.

While the invention has been described by means of specific examples and in specific embodiments, we do not wish to be limited thereto, for obvious modifications will occur to those skilled in the art without departing from the spirit and scope of the invention.

We claim:

1. A device for the control of a line-commutated converter having valves for the transmission of high DC voltage, comprising a vector phase filter having inputs coupled to the line and outputs and associated with the line voltage vector, said vector phase filter comprising a two-phase generator having outputs, a PI control unit having an input and an output connected to the two-phase generator, said two-phase generator being harmonic-free and having a frequency determined by the output of the PI control unit and means coupled between the outputs of the two-phase generator and the input of the PI control unit for energizing the PI control unit by a quantity depending upon the difference between the phase angle ($\beta$) of the line voltage vector and the phase angle ($\bar{\beta}$) of the vector provided by the output voltages of the two-phase generator, the vector phase filter producing two component voltages at its outputs; a vector rotator having inputs connected to the outputs of the vector phase filter, other inputs and outputs; means connected to the other inputs of the vector rotator for providing two voltages determining the control angle ($\alpha$), the vector rotator producing at its outputs voltages comprising the components of a rotating control vector; an angle switch having inputs connected to the outputs of the vector rotator and outputs, said angle switch being energized by the component voltages of the rotating control vector and providing at its outputs at specific recurring phase positions of the rotating control vector control pulses utilized to fire the valves of the converter.

2. A device for the control of a line-commutated converter as claimed in claim 1, wherein the two-phase generator of the vector phase filter comprises a first integrator having an input and an output, a first multiplier connected to the input of the first integrator for controlling the frequency thereof, a second multiplier, said first integrator having a negative feedback via the second multiplier for amplitude control, a second integrator having an input and an output, a third multiplier connected between the output of the first integrator and the input of the second integrator for controlling the frequency thereof, the first and second integrators and the first and third multipliers being connected in series circuit arrangement, and a fourth multiplier, said second integrator having a negative feedback via the fourth multiplier for amplitude control.

3. A device for the control of a line-commutated converter as claimed in claim 1, wherein the sum of the squares of the two voltages determining the control angle ($\alpha$) is always constant.

4. A device for the control of a line-commutated converter as claimed in claim 1, wherein the means for providing two voltages determining the control angle ($\alpha$) comprises a linearizing function generator providing a control voltage ($U_{St}$) and wherein one of the voltages determining the control angle ($\alpha$) is constant and the other of the voltages determining the control angle is the control voltage provided by the linearizing function generator.

5. A device for the control of a line-commutated converter as claimed in claim 1, wherein the vector rotator comprises first, second, third and fourth multipliers each having two inputs and an output, one of the inputs of the vector rotator being connected to a first input of each of the first and second multipliers, the other of the inputs of the vector rotator being connected to a first input of each of the third and fourth multipliers, one of the other inputs of the vector rotator being connected to the second input of each of the first and third multipliers, the other of the other inputs of the vector rotator being connected to the second input of each of the second and fourth multipliers, a first operational amplifier having a subtractive input connected to the output of the third multiplier and an additive input connected to the output of the second multiplier, and a second operational amplifier having a subtractive input connected to the output of the second multiplier and an additive input connected to the output of the first multiplier and the output of the fourth multiplier.

6. A device for the control of a line-commutated converter as claimed in claim 1, wherein the angle switch comprises a plurality of adding amplifiers having inputs connected to the outputs of the vector rotator and outputs, a plurality of threshold monitors each having an input connected to the output of a corresponding one of the adding amplifiers, and a plurality of AND gates having inputs connected to selected ones of the threshold monitors and outputs comprising the outputs of said angle switch.

7. A device for the control of a line-commutated converter as claimed in claim 1, wherein the vector phase filter further comprises a multiplier having an input connected to an output of the two-phase generator, another input and an output, means for applying a related line voltage ($U_{RS}$) to the other input of the multiplier, and smoothing means connected between the output of the multiplier and an input of the two-phase generator.

8. A device for the control of a line-commutated converter as claimed in claim 1, wherein the vector phase filter further comprises a pair of multipliers each having an input connected to a corresponding one of the outputs of the two-phase generator, another input and an output, means for applying a related line voltage ($U_{RS}$) to the other inputs of the multipliers, adder means having inputs connected to the outputs of the multipliers and an output connected to the input of the PI control unit for applying the sum of the outputs of the multipliers to said PI control unit, and amplitude shaping means for the related line voltage ($U_{RS}$) connected to an input of the two-phase generator.

9. A device for the control of a line-commutated converter as claimed in claim 2, wherein each of the second and fourth multipliers of the two-phase generator of the vector phase filter has an additional input and said two-phase generator further comprises an amplitude regulator having an integrating characteristic having an input and an output connected to the additional input of each of said second and fourth multipliers, adder means connected to the input of amplitude regulator, and means for applying to the adder means a constant voltage ($K_2^2$) and the sum of the squared output voltages of the two-phase generator in a manner whereby the difference between the constant voltage ($K_2^2$) and the sum of the squared output voltages of the two-phase generator is applied to the input of the amplitude regulator.

10. A device for the control of a line-commutated converter as claimed in claim 3, wherein the means for providing two voltages determining the control angle ($\alpha$) comprises means for providing a control voltage ($U_{st}$), a squaring function generator having an input connected to said means for providing a control voltage and an output, an adder having a subtractive input connected to the output of the squaring function generator, an additive input and an output, means for applying a constant voltage to the additive input of the adder, and a root-deriving function generator having an input connected to the output of the adder and an output connected to one of the other inputs of the vector rotator, said means for providing a control voltage ($U_{st}$) being connected to the other of the other inputs of the vector rotator.

11. A device for the control of a line-commutated converter as claimed in claim 4, wherein the linearizing function generator comprises a plurality of pairs of Zener diodes, a plurality of input resistors, each pair of Zener diodes being connected in series circuit arrangement with a corresponding one of the input resistors, each series circuit arrangement being connected in shunt with the others and an additional one of the input resistors being connected in shunt with the series circuit arrangements, a DC amplifier having a negative feedback, an input connected to said Zener diodes and said input resistors and an output, and an inverting amplifier having an input connected to the output of the DC amplifier.

12. A device for the control of a line-commutated converter as claimed in claim 8, wherein the amplitude shaping means comprises a rectifier having an input connected to the means for applying the related line voltage ($U_{RS}$) and an output, smoothing means having an input connected to the output of the rectifier and an output, an amplifier having an input connected to the output of the smoothing means and an output, and a squaring function generator having an input connected to an output of the amplifier and an output connected to an input of the two-phase generator.

13. A device for the control of a line-commutated converter as claimed in claim 8, wherein the amplitude shaping means comprises filter means having an input connected to the means for applying the related line voltage ($U_{RS}$) and an output, a squaring function generator having an input connected to the output of the filter means, smoothing means having an input connected to the output of the squaring function generator and an output, and an amplifier having an input connected to the output of the smoothing means and an output connected to an input of the two-phase generator.

14. A device for the control of a line-commutated converter as claimed in claim 8, further comprising additional adder means having an input connected to the output of the PI control unit, another input and an output connected to a frequency control input of the two-phase generator, and means for applying a voltage ($U_f$) proportional to the line frequency to the other input of the additional adder means.

15. A device for the control of a line-commutated converter having valves for the transmission of high DC voltage, comprising a plurality of vector phase filters, one for each phase on the line, each vector phase filter having inputs coupled to the line and outputs and associated with the line voltage vector, said vector phase filter comprising a two-phase generator having outputs, a PI control unit having an input and an output connected to the two-phase generator, said two-phase generator being harmonic-free and having a frequency determined by the output of the PI control unit and means coupled between the outputs of the two-phase generator and the input of the PI control unit for energizing the PI control unit by a quantity depending upon the difference between the phase angle ($\beta$) of the line voltage vector and the phase angle ($\bar{\beta}$) of the vector provided by the output voltages of the two-phase generator, the vector phase filter producing two component voltages at its outputs; a plurality of vector rotators, one for each phase on the line, each vector rotator having inputs connected to the outputs of a corresponding one of the vector phase filters, other inputs and outputs; means connected to the other inputs of each of the vector rotators for providing two voltages determining the control angle ($\alpha$), each vector rotator producing at its outputs voltages comprising the components of a rotating control vector; a plurality of angle switches, one for each phase on the line, each angle switch having inputs connected to the outputs of a corresponding one of the vector rotators and outputs, each of the angle switches being energized by the component voltages of the corresponding rotating control vector and providing at its outputs at specific recurring phase positions of the corresponding rotating control vector control pulses utilized to fire the valves of the converter.

* * * * *